Patented May 20, 1930

1,759,273

UNITED STATES PATENT OFFICE

PAUL NAWIASKY AND ARTUR KRAUSE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

MANUFACTURE OF DYESTUFFS

No Drawing. Application filed June 11, 1928, Serial No. 284,656, and in Germany June 27, 1927.

We have found that new and well-defined colored compounds are obtained by allowing aliphatic amines, in particular primary amines such as monomethyl- or monoethyl-amine to act on naphthazarine under mild conditions as regards the temperature used which should not exceed 100° C. so that the reaction does practically not lead to the formation of vat dyestuffs. By the action of monomethylamine on naphthazarine in this manner, a di-monomethyl-amino-hydroxy-naphthoquinone or a tri-monomethylamino-naphthoquinone are obtained. Condensing catalysts having a reducing action such as for example zinc dust or stannous chlorid, or substances regulating the amount of aliphatic amine entering into the naphthazarine molecule such as boric acid are preferably added to the reaction mixture, though the reaction proceeds also without the said addition. The new compounds possess excellent tinctorial properties, and they may also be employed with advantage as intermediate products in the dyestuff industry. The products are specially suitable for the production of valuable dyeings and prints on cellulose esters or ethers, strong tinctorial effects in varying shades and of excellent fastness being obtained with the usual methods of dyeing cellulose esters or ethers.

The following examples will further illustrate the nature of this invention which however is not restricted thereto. The parts are by weight.

Example 1

10 parts of naphthazarine, 75 parts of a 30 per cent aqueous solution of monomethylamine and 1 part of zinc dust, are heated and stirred at 60° centigrade in a closed vessel for 20 hours. The deposited reaction product is filtered by suction, and washed with cold water; it can be freed from sparingly soluble by-products by extraction with boiling monochlorbenzene. The crude product obtained on concentrating the monochlorbenzene liquor, furnishes, on crystallization from glacial acetic acid, or on sublimation in a high vacuum, the pure dyestuff in the form of dark acicular crystals of metallic lustre, with a melting point of 224° to 226° centigrade. It is insoluble in aqueous caustic soda. With concentrated sulfuric acid it furnishes an orange colored solution which assumes a blue color on the addition of formaldehyde. It dissolves readily to a bluish-green solution in organic solvents. From the analytical data, it has the composition of a tri-monomethyl-amino-naphthoquinone. The reaction probably proceeds according to the following equation:

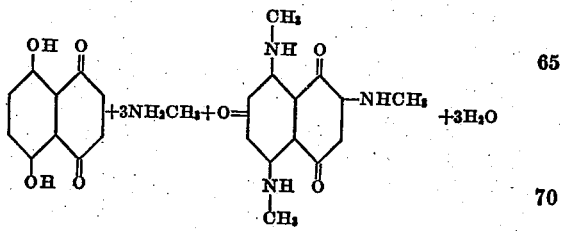

Example 2

10 parts of naphthazarine, 75 parts of a 30 per cent aqueous solution of monomethylamine and 1 part of crystallized boric acid are heated and stirred at from 50° to 60° centigrade for 10 to 20 hours in a closed vessel. After cooling and filtering by suction, the crude product is separated from sparingly soluble by-products by boiling with monochlorbenzene. The dyestuff which separates out on cooling is purified by recrystallization from monoclorbenzene or by sublimation in a high vacuum, and is thus obtained in the form of dark red needles melting at 248° to 252° centigrade. According to analysis, it is a di-monomethylamino-hydroxy-naphthoquinone. The reaction probably proceeds according to the following equation:

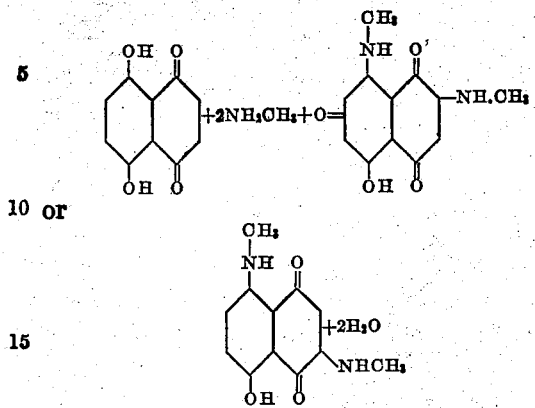

or

The dyestuff gives a blue-violet solution in warm dilute caustic soda solution, and a red solution in sulfuric acid. The solution in monochlorbenzene is red with a bluish tinge. This substance can be converted, more or less completely, into the bluish-green dyestuff described in Example 1, by energetic treatment with a dilute alcoholic solution of methylamine with the addition of zinc dust, at from 60° to 75° centigrade. The separation may be effected, for example, by utilizing the different solubility of the two products in monochlorbenzene, in which the red dyestuff is considerably less soluble.

What we claim is:—

1. A process of producing new colored compounds which consists in acting on naphthazarine at temperatures not exceeding 100° C. with primary aliphatic amines.

2. A process of producing new colored compounds which consists in acting on naphthazarine at temperatures not exceeding 100° C. with primary aliphatic amines in the presence of condensing catalysts.

3. A process of producing new colored compounds which consists in acting on naphthazarine at temperatures not exceeding 100° C. with monomethylamine in aqueous solution in the presence of condensing catalysts.

4. A process of producing new colored compounds which consists in acting on naphthazarine at temperatures not exceeding 100° C. with monomethylamine in aqueous solution in the presence of zinc dust.

5. As a new article of manufacture colored compounds forming dark needles sublimable in a high vacuum and obtainable by acting on naphthazarine with primary aliphatic amines at temperatures not exceeding 100° C.

6. As a new article of manufacture colored compounds forming dark needles sublimable in a high vacuum having a melting point between 224° and 226° C. and obtainable by acting on naphthazarine with monomethylamine at temperatures not exceeding 100° C.

7. As a new article of manufacture tri-monomethyl-amino-naphthoquinone forming dark acicular needles of metallic lustre sublimable in a high vacuum, of a melting point between 224° and 226° C., soluble in concentrated sulfuric acid to an orange solution turning blue on the addition of formaldehyde.

In testimony whereof we have hereunto set our hands.

PAUL NAWIASKY.
ARTUR KRAUSE.